United States Patent
Corbellini et al.

(10) Patent No.: US 9,332,522 B2
(45) Date of Patent: May 3, 2016

(54) AUDIOLOCATION SYSTEM COMBINING USE OF AUDIO FINGERPRINTING AND AUDIO WATERMARKING

(71) Applicant: DISNEY ENTERPRISES, INC., Burbank, CA (US)

(72) Inventors: Giorgio Corbellini, Zurich (CH); Stefan Mangold, Berne (CH); Vladimir Vukadinovic, Zurich (CH)

(73) Assignee: Disney Enterprises, Inc., Burbank, CA (US)

(*) Notice: Subject to any disclaimer, the term of this patent is extended or adjusted under 35 U.S.C. 154(b) by 217 days.

(21) Appl. No.: 14/282,062

(22) Filed: May 20, 2014

(65) Prior Publication Data

US 2015/0341890 A1 Nov. 26, 2015

(51) Int. Cl.
- *H04W 64/00* (2009.01)
- *H04W 4/04* (2009.01)
- *H04W 4/02* (2009.01)

(52) U.S. Cl.
CPC ............ *H04W 64/00* (2013.01); *H04W 4/02* (2013.01); *H04W 4/04* (2013.01)

(58) Field of Classification Search
USPC ............ 382/100, 232; 380/210, 287, 54; 713/176; 480/460; 386/94; 399/366; 283/902; 358/1.14, 3.28; 726/26, 31
See application file for complete search history.

(56) References Cited

U.S. PATENT DOCUMENTS

| | | | |
|---|---|---|---|
| 8,620,772 B2* | 12/2013 | Owen | H04W 4/001 705/26.62 |
| 8,805,110 B2* | 8/2014 | Rhoads | G06K 9/00 382/255 |
| 9,118,771 B2* | 8/2015 | Rodriguez | G01C 21/20 |
| 2004/0008864 A1 | 1/2004 | Watson | |
| 2010/0322469 A1* | 12/2010 | Sharma | G10L 19/018 382/100 |
| 2011/0159921 A1 | 6/2011 | Davis et al. | |
| 2011/0279479 A1 | 11/2011 | Rodriguez et al. | |
| 2012/0066035 A1 | 3/2012 | Stanger | |
| 2012/0214515 A1* | 8/2012 | Davis | H04W 4/023 455/456.3 |
| 2012/0303147 A1 | 11/2012 | Shah et al. | |
| 2013/0321208 A1 | 12/2013 | Sathish et al. | |
| 2014/0006025 A1 | 1/2014 | Krishnan et al. | |

OTHER PUBLICATIONS

Hampton "An app today keeps the museum guide away; Indoor GPS lets smartphone take you on a tour," National Post [Don Mills, Ont.] Aug. 1, 2012.

* cited by examiner

*Primary Examiner* — Barbara Reinier
(74) *Attorney, Agent, or Firm* — Marsh Fischmann & Breyfogle LLP; Kent A. Lembke

(57) ABSTRACT

An audio-based navigation system for determining a present location or position of a mobile device such as a smartphone within a venue. The system includes a sound system with a first speaker playing first audio content and a second speaker playing second audio content. The first speaker is positioned in a first space in a venue, and the second speaker is positioned in a second space of the venue. The navigation system also includes a mobile device with memory storing a database of fingerprints of a plurality of differing audio content. The mobile device includes a microphone for receiving an audio signal associated with the first audio content or with the second audio content. The mobile device includes a processor(s) selectively running software to determine the mobile device location in the first or second space using either fingerprinting or watermarking module by processing the received audio signal.

23 Claims, 5 Drawing Sheets

AUDIOLOCATION SYSTEM COMBINING USE OF AUDIO FINGERPRINTING AND AUDIO WATERMARKING

BACKGROUND

1. Field of the Description

The present description relates, in general, to techniques for determining a location of a mobile device such as a wireless or cellular phone, and, more particularly, to methods and systems (which could be labeled or thought of as an "audiolocate" method or an audiolocate system) that enhance localization of mobile devices such as phones (or phone navigation) through the combined and improved use of audio fingerprinting and audio watermarking.

2. Relevant Background

There are many instances where visitors to public and private venues, such as sport stadiums, theme parks, shopping malls, expos, fairs, and theaters, could benefit from mobile Location Based Services (LBS) provided on their mobile devices (e.g., smartphones and other wireless and/or cellular phones, tablets, digital cameras, handheld video games, and the like and the term "phones" is used herein as an example of such mobile devices). For example, LBS may provide visitors to these venues with relevant information associated with their present location in the venue to help them navigate through the venue, to organize their time and activities while at the venue, and to make their overall experience while visiting the venue more entertaining and enjoyable.

To be effectively implemented, LBS typically require that location information is available on a phone. To meet this need, a variety of localization techniques have been developed and utilized with varying levels of success. For example, localization technologies may rely on satellite (e.g., global positioning system (GPS) technologies) and terrestrial radio infrastructure (e.g., Wi-Fi and global system for mobile communications (GSM) based localization). This infrastructure or technology may not always be available (e.g., GPS is generally not available for use or effective when a phone is indoors) or may provide insufficient precision to provide localization with sufficient accuracy to facilitate providing LBS on a phone (e.g., GSM towers are sparely deployed). Further, these localization techniques make use of radio transceivers on phones, and radio transceivers are often energy-hungry devices that may quickly and undesirably drain the battery of a phone. Additionally, data transmission using GSM or Wi-Fi may not be "free" such that if using radio costs money it may be more desirable to use audio, which is typically free.

Audio-based localization in the form of either audio watermarking or audio fingerprinting has also been developed, but these technologies also have only been partially successful in supporting LBS on phones. Audio watermarking involves embedding imperceptible information into an audio content, such as music or a soundtrack, without affecting its audibility. The piece of embedded information ("audio watermarks") can be received and decoded by a mobile device such as a smartphone. Audio watermarking enables location beacons to be embedded into the sound emitted by a loudspeaker. The beacons may simply contain the loudspeaker's unique identification (ID) and other information such as GPS coordinates and some contextual location information.

Since audio watermarking allows one to transmit different data with every individual loudspeaker, it enables phone localization on a per-speaker granularity. The location precision depends mainly on the density of the loudspeakers in a space as even if the speakers are playing the same audible content (as perceived by listeners) the embedded data can still be different. Hence, the location information is very precise. However, for audio watermarking to be applied in a real world environment, careful data embedding, such as with spectrum channel management to avoid interferences, and symbol synchronization are required. These have proven to be the limiting factors for the system reliability such that audio watermarking is often ineffective or at least less useful in noisy environments, e.g., environments where lower quality speakers are utilized, where multiple overlapping speakers are concurrently perceived by a phone, and where other sounds such as crowd noise are received with the output sound from the loudspeaker.

Audio fingerprinting enables an unknown audio sequence to be recognized by analyzing its perceptual characteristics and matching them against a database of known sequences. With audio fingerprinting, a mobile phone can be configured so as to be able to identify the audio content, e.g., a song, emitted from the loudspeakers. By relating the content to the location of the emitting loudspeakers, the phone (e.g., its processor(s) running one or more software programs or modules) is able to coarsely determine its location (e.g., the phone is within hearing distance of a particular loudspeaker).

Audio fingerprinting does not require any preprocessing of the audio content (if one does not consider creation of the actual fingerprint database), and it is more robust in noisy environments than audio watermarking. However, audio fingerprinting fails to provide the same high level of accuracy as is achievable with audio watermarking. For example, each loudspeaker in a venue space may not play or output distinguishable sounds. In fact, a number of speakers may be used to play the same sound or audio content, which in many localization or LBS environments can drastically limit the achievable location precision (e.g., the phone is located within a sound-perceiving radius of any of a number of speakers). Additionally, audio fingerprinting requires the use of a precompiled database of sequences for use in comparison processes to properly identify an audio fingerprint, and this database typically has to be stored in the phone's memory.

Hence, there remains a need for an improved method (and associated system) for providing improved localization of mobile devices such as phones. Preferably, such a method would be useful for providing audio-based localization and would be adapted for use within existing venues such as through use of existing sound systems and their loudspeakers, with audio-based location being fully independent from radio.

SUMMARY

The present description teaches an audio-based localization method and system (or an audiolocate method and system) that is adapted to provide a reliable solution to exploit speakers of a sound system to provide phone (or other mobile device) navigation. Prior techniques lacked reliability and often provided only limited localization precision whereas the audiolocate method is reliable in nearly all environments and provides localization with adequate precision to support providing LBS via the phone. In some implementations, the audiolocate method helps mobile phone applications to identify their positions within a venue. To achieve accurate position or location determination, the audiolocate method uniquely combines audio fingerprinting with audio watermarking.

Audio fingerprinting is a method to process audio data to generate a representational hash known as the fingerprint and to identify an audio content by matching its fingerprint against a database of known fingerprints/contents. An audio fingerprint is typically not a simple cryptographic hash (or digest) of an audio file, but it is, instead, based on the perceptual characteristics of the audio content rather than on its digital representation. This enables two audio files that have similar audio contents but different digital formats (e.g., MP3 and WAV) to be matched using fingerprinting techniques (e.g., by a fingerprint module). Hence, audio fingerprinting enables computers to imitate the way in which humans recognize similar sounds. In addition to capturing perceptual information in a compact fingerprint form, audio fingerprinting may be performed or adapted to enable efficient fingerprint lookup in order to match an audio content against a potentially huge database of fingerprints.

Digital audio watermarking involves embedding imperceptible information into an audio content (e.g., music, a soundtrack, an announcement, and the like) without affecting its audibility to a listener. The embedded information (or payload or watermark) gives to the media assets a persistent identity, and the embedded information or payload can later be extracted and interpreted (e.g., by a watermark module) by devices (e.g., a smartphone) to identify, protect, synchronize, or monetize the asset. The audio watermark information survives signal compression and transitions in the broadcast chain. One advantage that watermarking provides over fingerprinting is the scalability as fingerprinting may be limited as least partially by the use of a database (which may be centralized or distributed out to the device memory) containing fingerprints of numerous audio assets.

The audiolocate method (or "audiolocation") combines the advantages of the audio watermarking and fingerprinting approaches in a novel way to build a faster and more reliable navigation support system. Audiolocation uses the reliable and fast information output from first performing audio fingerprinting on a received sound stream (audio input) to assist performance of audio watermarking (which is typically more precise than fingerprinting). For example, the audiolocation may use fingerprinting to determine the type of sound and to identify a timestamp within the sound, and the audiolocation may then perform watermarking synchronization and data reception based on this fingerprinting data or results. In other or the same implementations, audiolocation may use the information obtained by performing the audio fingerprinting when audio watermarking fails (e.g., when an environment is found to be too noisy for watermarking). Audiolocation may also be adapted to select the location determination method (fingerprinting or watermarking) based on the expected energy consumption and/or central processing unit (CPU) load on the mobile device (e.g. on the smartphone).

More particularly, an audio-based navigation system is provided for determining a present location or position of a mobile device (e.g., a smartphone, tablet or other portable computing device, and the like) within a venue. The system includes a sound system with a first speaker playing first audio content and a second speaker playing second audio content. The first speaker is positioned in a first space in a venue, and the second speaker is positioned in a second space of the venue. The navigation system also includes a mobile device with memory storing a database of fingerprints of a plurality of differing audio content. The mobile device also includes a microphone for receiving an audio signal associated with the first audio content or with the second audio content. The mobile device also includes a processor(s) selectively running a fingerprinting module and a watermarking module to determine a location of the mobile device by processing the received audio signal.

The received audio signal typically includes a watermark (or location beacon) identifying the first speaker or identifying the second speaker as a source of the received audio signal. The watermarking module decodes the watermark (e.g., to find a timestamp and a speaker ID that can be cross-referenced to a speaker-based location) to provide the location of the mobile device relative to the first or second speaker. The fingerprinting module determines the location by generating a fingerprint based on the audio signal, comparing the generated fingerprint with the fingerprints in the database to find a best matching fingerprint, and finding a location cross-referenced to the best matching fingerprint.

In some implementations, the processor runs the fingerprinting module and the watermarking module in parallel to process the audio signal. In such implementations, the location is provided by the watermarking module when a watermark is decoded from the audio signal by the watermarking module and provided by the fingerprinting module when decoding by the watermarking module fails.

In other implementations where CPU load and energy consumption during localization are of concern, the processor initially only runs the fingerprinting module to provide the location and then runs the watermarking to provide the location after the audio signal is locked based on processing by the fingerprinting module. The audio signal is "locked" in some cases when a fingerprint match achieved by the fingerprinting module has a confidence level greater than a present minimum confidence level.

In some cases, the processor switches the fingerprinting module off when the audio signal is locked, and the processor resumes use of the fingerprinting and switches the watermarking module off when the watermarking is unable to decode a watermark in the received audio signal. In other cases, though, the processor switches the watermarking module off after a first watermark is decoded in the received audio signal and switches the fingerprinting module on to provide the location on a periodic basis. In such cases, the fingerprinting is performed at an increased frequency upon a loss of signal lock (e.g., at frequency of 200 ms rather than once every 15 to 120 seconds when simply verifying the mobile device is still near the speaker identified by watermarking).

DETAILED DESCRIPTION

Figure 1:
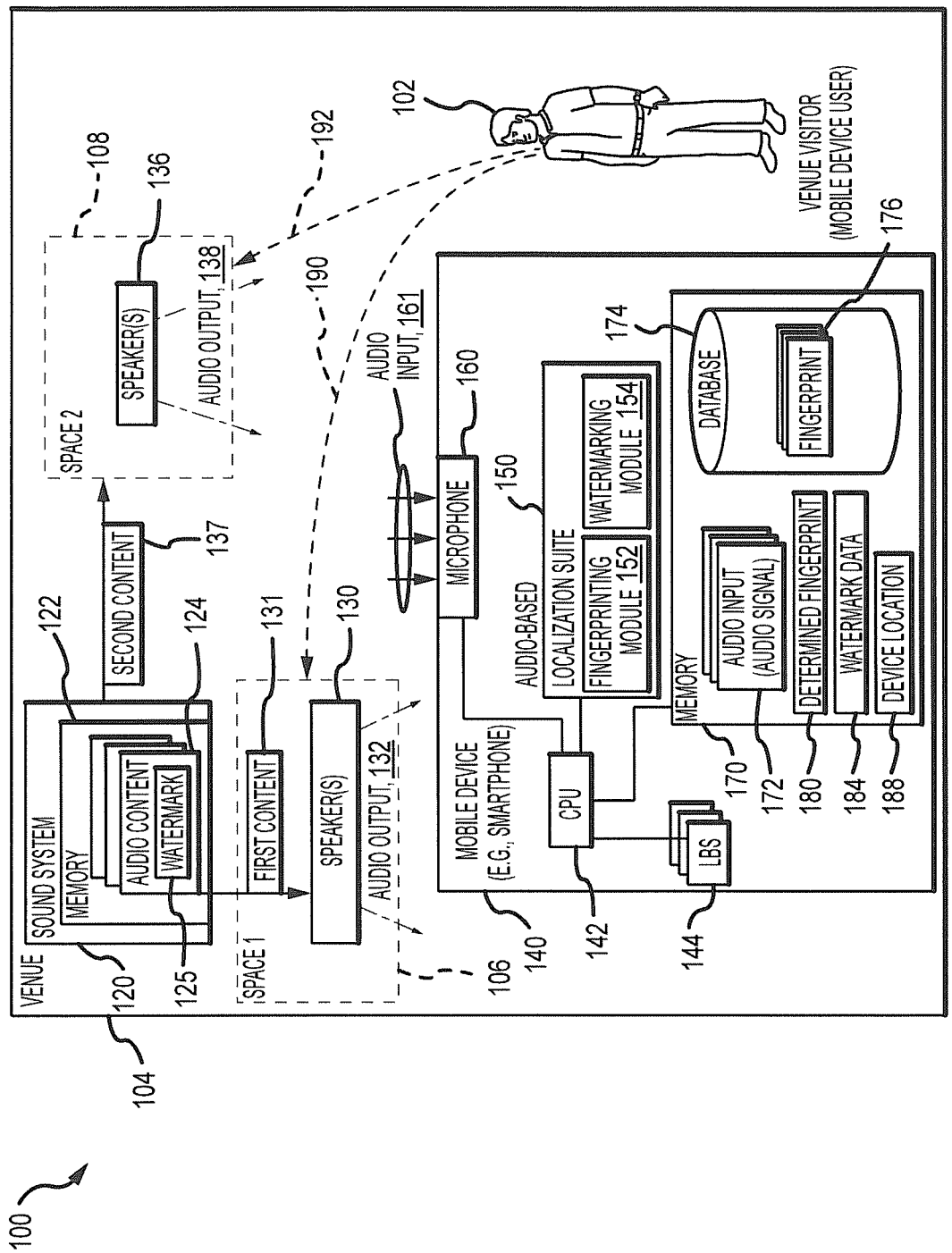
FIG. 1 is a functional block diagram of a mobile device navigation system using audiolocation as described herein.

In brief, methods and systems are described herein that are designed and implemented to provide audio-based localization of mobile devices such as smartphones in a venue space. The methods may be referred to as audiolocate methods or audiolocation, and the methods make use of a venue's sound system that includes multiple loudspeakers deployed throughout the venue. The methods also make use of microphones on the mobile devices to receive audio input (e.g., output of the loudspeakers of the sound system), and such microphones generally consume very little energy. The smartphone has one or more processors that run the audiolocate software that includes a localization suite including an audio watermarking module and also an audio fingerprinting module (e.g., two smartphone applications that work in a cooperative manner), and the methods taught are configured to use two audio content identification techniques (watermarking and fingerprinting) to provide smartphone (or other mobile device) localization within the venue.

The description explores how sounds emitted by nearby loudspeakers can be used to enable location-based services on smartphones. Sound-based localization is energy efficient and can be adapted to leverage any existing sound system infrastructure such as the sound system of an entertainment park or a sports stadium. There are two well known audio identification methods that have been used separately in the past for localization: (1) watermarking and (2) fingerprinting. Used separately for localization, both of these technologies may have pros and cons. However, the audiolocate methods taught herein combine the two technologies for localization in a manner that retains the pros or advantages while limiting or even eliminating the cons or disadvantages.

In one prototype, the audiolocate method was implemented on a test bed, which allowed the inventors to evaluate location detection performance of each technique in terms of energy consumption, CPU load, time to obtain a location fix for a mobile device, and probability of false detection. Based on these results and other design parameters, the audiolocate methods (and corresponding systems) discussed herein generated by the inventors and are proposed as being useful for effectively combining watermarking and fingerprinting to achieve more robust performance in the presence of noise, interference, and mobility.

Prior to turning to the figures and exemplary implementations of one or more audiolocate methods and systems, it may be useful to describe software implementations for the audio watermarking module and for the audio fingerprinting module that may be used as part of an audiolocate suite on a mobile device such as a smartphone configured for audio-based localizations. Then, with these exemplary software implementations understood, the description will discuss results of one test of the use of these software modules in a localization system. The description then proceeds to discuss with reference to the figures localization systems and methods that may be used to apply audiolocation as taught herein.

Note, unlike most of the prior localization work, the localization methods evaluated in this description do not require dedicated anchor infrastructure. Instead, existing audio installations including speakers that emit the commonly used audio content may be used. The self-localization of devices that are carried around (e.g., smartphones, tablets, and the like) is performed using the devices' microphones only, and the devices typically are not required to emit any sound by themselves to determine their location or position within a venue's space.

First, the mobile device may be configured for performing localization using audio watermarking. For example, a smartphone application may be downloaded onto a smartphone for processing audio input to extract and interpret an audio watermark embedded into received audio or audio input via its microphone as received from loudspeakers in a venue space. The watermarking method performed by this watermarking module or smartphone application enables receipt and understanding of inaudible data transmitted via altering the phases of the carrier signal (e.g., audio track).

To alter the phases of an audio signal, the time frequency representation is computed. To this end, the watermarking module may use the Modulated Complex Lapped Transform (MCLT) because the resulting artifacts are typically less audible, but some implementations may use a regular Discrete Fourier Transform (DFT). The carrier signal is partitioned into equally sized blocks of 2D samples, and the computation of the MCLT over a number of 2D real-valued samples returns D complex coefficients that represent one block. Each coefficient of a block carries the amplitude and the phase at one sub-band within the frequency spectrum. Though the energy contained in different blocks has a different distribution over the frequency spectrum, most of the energy is contained in the central part.

Further, since it is not possible to alter the phase of a coefficient in absence of energy, only the central part of the frequency spectrum is used to embed data. Only frequencies with some energy/content can carry data, which means that if at a given frequency there is no content (e.g., if there is a silence interval in the audio domain) one cannot alter the phase. The reason why only central frequencies are used is (at least) twofold: (1) it is most likely that these frequencies contain some energy and (2) if a very large spectrum is used to embed data, there can be too many audible artifacts. In terms of coefficients, this means that only M subbands (out of D) carry information. The watermarking parameters in an exemplary implementation including the central subband range between the lower and the higher band frequencies may be: (a) sampling rate, which may have a value of 44100 Hz; (b) lower frequency (e.g., 5900); (c) upper frequency (e.g., 10050); (d) block size (e.g., 4096); (e) packet size (e.g., 5 blocks); (f) subbands M (e.g., 384); and (g) spreading code size K (e.g., 4).

Phase encoding is prone to errors, and, as a result, it is desirable to provide some error protection in the audio watermarking module/smartphone application. For example, the audio watermarking module may be configured to protect the audio watermark or watermarking data using spreading codes, redundancy, and interference cancellation. The use of spreading codes has the effect of distributing the content of every bit of data over multiple subbands, which increases the size of the sequence to transmit. Measurements presented in this description use spreading codes of size K equal to 4, which was found to be a relatively small size that still provided good performance. Each bit of information alters the phase of one coefficient while the amplitude remains unchanged. The alteration causes the rotations of the MCLT coefficients in the complex plane. Instead of sending plain phases into every block of samples, the data can be encoded using a Differential Binary Phase Shift Keying (DBPSK). The use of DBPSK limits the effect of phase shifts after transmission. After the process of phase alteration, every MCLT block can be transformed back to the time domain using an inverse MCLT. In some cases, the watermarking software embeds data into every second MCLT block to avoid interference among neighboring blocks.

To decode watermarks in audio input, the receiver (or the watermark module on the device) is operated to sample the audio signal (i.e., audio input via the microphone), partition the audio signal into equally sized blocks of size D, and apply the MCLT to each block. Then, the receiver/watermarking module analyzes the phases of the M central subbands of the received samples. The value of every phase is then normalized in the range [−1,1], and its amplitude is proportional to the likelihood that it represents the corresponding spreading code symbol. A figure close to zero means that the given value does not correspond to any of the expected spreading code symbols. Then, the sequence of normalized phases is mapped back to the logical bit stream with symbols 0 and 1 such as by cross-correlating equally sized sub-sequences of length K with the spreading code used by the transmitter.

The result is a sequence of correlation coefficients. The sign of every coefficient gives the corresponding received logical bit (1-bit if position and 0-bit if negative). Before being able to correctly receive the transmitted data, the receiver or watermark module acts to synchronize the signal. The receiver is synchronized to the carrier signal so as to be able to parse different blocks that carry the watermarks. The synchronization process of the receiver or watermark module may include testing every possible sample offset to find the right one.

Second, the mobile device may be configured for performing localization using audio fingerprinting. For example, a smartphone application may be downloaded onto a smartphone for processing audio input or an audio signal to identify the audio signal by matching the signal's fingerprint against a database of known fingerprints. The known set of audio signals (e.g., songs played on a loudspeaker of sound system in a space of a venue) typically would be processed offline to generate a number of representational hashes known as the fingerprints, and these hashes are stored in each mobile device in a fingerprint database (e.g., in the memory of a smartphone accessible by the fingerprint module).

Audio fingerprinting includes processing audio data to generate a representational hash, known as the fingerprint of the audio input or signal, and then includes identifying an audio content by matching its fingerprint against a database of known fingerprints/contents. An audio fingerprint is typically not a simple cryptographic hash (or digest) of an audio file. It is based on the perceptual characteristics of the audio content rather than on its digital representation. This enables the fingerprinting module to match two audio files that have similar audio contents but different digital formats (e.g., MP3 and WAV files can be matched if same audio content). Hence, audio fingerprinting enables a mobile device such as a smartphone to imitate the way in which humans recognize similar sounds. In addition to capturing perceptual information in a compact fingerprint form, audio fingerprinting by the fingerprinting software/module preferably enables efficient fingerprint lookup in a database to match an audio content against a potentially large database of previously generated/compiled fingerprints.

In some cases, the audio fingerprinting module may be designed to use wavelet-based audio fingerprinting that uses a local database of fingerprinting stored in the mobile device's memory (but other fingerprinting techniques may be used to practice the invention). A first step to generate an audio fingerprint may involve decoding the input audio file into a raw digital format, such as a Pulse Code Modulation (PCM) format, in which the magnitude of the signal is sampled regularly (e.g., at 44100 Hz or the like). Since important frequencies for the human auditory system are between 318 Hz and 2000 Hz, the signal can be downsampled to 5000 Hz.

The next step performed by the fingerprinting module may be to build a spectrogram of the audio input. The signal can first be sliced into overlapping frames and then each frame can be passed through a Fast Fourier Transform (FFT) in order to get the spectral density varying in time domain. In one specific but non-limiting implementation, the module uses slices that are 371 milliseconds (ms) long that are taken every 11.6 ms. After the FFT transform is accomplished on each slice, the output spectrogram can be cut such that a 318 Hz to 2000 Hz band is obtained. The band is then encoded into 32 logarithmically spaced frequency bins so the 2048 samples (11.6 ms) in time domain are reduced to 1025 samples in frequency domain, which are then summed into 32 samples called spectral sub-images, each corresponding to one frequency bin.

In the next step, standard Haar wavelets can be computed for each spectral sub-image. Instead of using the entire set of wavelets, the module may only keep a subset such as the top 200 wavelets (by magnitude for example) that most characterize the song, thus making the sub-fingerprints resistant to noise and other degradation. Furthermore, only the sign bits and not the full coefficients of the top wavelets may be utilized. The top 200 wavelets with positive values can be labeled as 01, with negative as 10 and zero as 00. This results in a bit vector that is sparse and resistant to small degradations. The next (and sometimes final) step of sub-fingerprint creation can be to determine a compact yet nearest-neighbor indexable representation of the bit vector. This Min-Hash technique can be used for this purpose if desired. A Min-Hash computed signature, which can include 100 8-bit integers, is the final sub-fingerprint of a spectral sub-image.

In one implementation of the fingerprinting module, the following parameters were used with their exemplary values provided in parentheses: (a) lower frequency (318 Hz); (b) upper frequency (2000 Hz); (c) slice length (371 ms); (d) slice interval (11.6 ms); (e) number of hash tables (20) (with slice length, slice interval, and number of hash tables being database creation parameters); (f) snippet length (371 ms); (g) snippet interval (11.6 ms); and (h) minimum votes (1) (with snippet length, snippet interval, and minimum votes being retrieval parameters).

Finding a nearest neighbor in a 100-dimensional space is not trivial. Therefore, the fingerprinting module may be adapted to use locality-sensitive hashing (LSH) in some cases, and LSH is an algorithm for finding nearest neighbors that is not only efficient in terms of the number of required comparisons but is also robust to noise. Unlike the standard hashing procedure, LSH performs a series of hashes with each examining only a portion of the sub-fingerprint. The sub-fingerprint is partitioned, e.g., into 20 non-overlapping 5-byte subvectors, which are then hashed, e.g., into 20 separate hash tables, which each use one of the subvectors as input to the hash function.

Candidate neighbors can then be retrieved by partitioning the query-fingerprint in the same manner and collecting the entries in the corresponding hash bins. The final list of potential neighbors is created by vote counting in some implementations of the fingerprinting module, with each hash casting votes for the entries of its indexed bin and by retaining the candidates that receive some minimum number of votes. Since the database may be kept relatively small in many venue implementations, the module may be configured to retain all candidates that receive at least one vote. All candidates are then analyzed in order to find the best match. Hamming distances between the query-fingerprint and candidates are calculated in order to decide which candidate is the best match. When creating the query-fingerprint, the entire audio file is typically not fingerprinted. Instead, an arbitrary snippet length and snippet interval may be used, making a tradeoff between accuracy and processing time.

FIG. 1 illustrates a mobile device navigation system 100 in simplified, functional block form. As shown, the system 100 includes (or is implemented in) a venue 104 such as an entertainment or public venue that a visitor or mobile device user 102 visits while carrying a mobile device 140 (e.g., a smartphone, a tablet, or other device). The system 100 includes a sound system 120 with one or more speakers 130, 136 provided in differing spaces 106, 108 of the venue 104. The sound system 120 has memory 122 storing audio content 124 such as a plurality of songs, soundtracks, public announcements, and the like in digital format.

Each of the audio files or pieces of audio content 124 is adapted to include an audio watermark 125, as discussed above or the watermark may be provided by a beacon transmitter provided at each speaker to ID that speaker, that may provide data associated with a location and/or an identification of a speaker 130, 136. During operation of the sound system 120, first content 131 (e.g., one of the audio files 124) is played on speakers 130 in the first space 106 of the venue 104 while second content 137 (e.g., a different one of the audio files 124 with a different watermark 125 than the first content 131) is played on speakers 136 in the second space 108 of the venue 104. The spaces 106 and 108 may be physically separated from each other as shown or, as is common, these spaces may at least partially overlap in their boundaries or have the audio output 132, 138 be heard in both spaces concurrently by the mobile device 140. In operation, the user/visitor 102 may move as shown with arrow 190 into the first space 106 where the device 140 receives via microphone 160 audio input 161 based on audio output 132 from speaker(s) 130 or the visitor 102 may move as shown with arrow 192 into the second space 108 where the device 140 receives via microphone 160 audio input 161 based on audio output 138 from speaker(s) 136.

The mobile device 140, which may be a smartphone or other device useful for localization, is adapted for determining the present position of the device 140 (and its user 102) within the venue 104. For example, the device 140 functions to determine whether the user 102 has moved 190 into space 106 or moved 192 into space 108. To this end, the mobile device 140 includes a processor 142 executing (from local memory in the form of code in non-transitory computer readable medium) software in the form of an audio-based localization suite 150. This suite/application 150 includes both a fingerprinting module 152 and a watermarking module 154 such that it can perform audio-based localization of the device 140 using either or both of audio fingerprinting and audio watermarking, e.g., according to any of the localization methods or the audiolocation techniques taught in this description.

Further, the processor 142 manages operation of the microphone 160 to receive audio input/signals 161 from the output 132, 138 of the speakers 130, 136 (e.g., based on which space 106, 108 the device 140 is positioned within with the user 102). The processor 142 also manages operation of or accessing of the device memory 170, and this includes storing received audio inputs/audio signals 172 from the microphone 160 for processing by the audio-based localization suite 150. The memory 170 is used to provide a database (or databases) 174 that stores a plurality of fingerprints 176 for use in comparing operations by the fingerprinting module 152.

Particularly, the fingerprinting module 152 may be used to process the audio signal (or snippets of such a signal) 172 to determine a fingerprint 180, and this fingerprint 180 is compared by module 152 with fingerprints 176. When a match is found, the speaker 130 may be determined (e.g., a particular song is only played in a particular space 106 and/or by a particular speaker 130 or at a particular time), and, from this information, the device location 188 (e.g., its GPS coordinates or the like) within the venue 104 may be identified by the suite (e.g., the device 140 may be determined to be in space 106 or space 108 based on an identified song and its identifying fingerprint 176 and 180).

In the same or other cases, the suite 150 may also use watermarking module 154 to process the audio signal 172 to identify watermark data 184 in the signal 172. If this is found, the data 184 can be processed to determine the speaker 130 or 136 providing the audio input 161 via its output 132, 138, and, with the speaker(s) 130, 136 identified, the suite 150 can determine the device location 188. With the location 188 defined by the audio-based localization suite 150, the mobile device 140 may operate to more effectively provide LBS 144 downloaded onto or accessed by the mobile device 140. For example, videos may be played via LBS 144 on the device 140 based on the location 188 so as to match the space 106, 108 or activities in the space 106, 108.

As part of creating and designing the audiolocation suite 150 to coordinate operation of the fingerprinting and watermarking modules 152, 154, a number of experiments were performed on a test bed to evaluate and compare localization performances of audio watermarking and fingerprinting. With regard to the test bed set up, the experiments were performed in an office space with a sound system including six loudspeakers deployed in a spaced apart manner along a hallway/corridor. Sound refractions off the walls made it more challenging to localize a mobile device (a smartphone was used in tests) in such a setup than would be the case in an anechoic open space.

The loudspeakers were operated to each play the same song from an album or soundtrack. The songs were played one after the other during the experiments so that each measurement spanned several songs. Location beacons (watermarks) that contain the ID of the corresponding loudspeaker were embedded into the sound emitted by each loudspeaker. Two smartphones were placed together in approximately the same position within the test space and then localized using the sounds. One smartphone ran a watermarking application (software module as discussed above), and the other smartphone ran an audio fingerprinting application (software module as discussed above). Only the watermarking application made use of the embedded location beacons. Performance indicators, as described below, were collected and logged on the smartphones and statistically evaluated.

As part of the testing, four metrics were used to measure the performance of audio localization based on watermarking and fingerprinting: (1) CPU load; (2) battery consumption; (3) time-to-fix; and (4) success rate. With regard to CPU load, the testing measured the CPU usage on the phone while it is trying to decode the location beacon (in case of watermarking) or extracting and matching a fingerprint (in case of fingerprinting). Since the smartphone used in the test had two cores, CPU load was measured as a sum of CPU loads on both cores (e.g., maximum of 200 percent).

With regard to energy consumption, the test measured the average current drained from the battery while the phone was attempting to decode the location beacon (in case of watermarking) or extracting and matching a fingerprint (in case of fingerprinting). The current was measured indirectly by measuring the time that it takes to drain a fully charged battery (e.g., a 1440 mAh battery). With regard to time-to-fix (or time-to-response), the test measured the time from the moment when location information is requested until the first location beacon is received and decoded (in the case of watermarking) or the first match to the received sound is found in the fingerprint database (in the case of fingerprinting). The location information might necessarily be correct, and the response can be a success or a failure. The test also measures a success rate, which was the percentage of responses that contain correct information location information, e.g., an ID of the nearest loudspeaker to the localized phone.

With regard to time-to-success, the test measured the time from the moment when location information is requested until the correct location information is obtained. In case of watermarking, phones continuously listen and decode location beacons/watermarks until a beacon from the closest loudspeaker is received. In case of fingerprinting, phones periodically create fingerprints of the received sound and search for the best match in the database until they get a match that corresponds to the sound emitted by the closest loudspeaker.

With these metrics in mind, it may be useful at this point to describe exemplary performance results using watermarking and using fingerprinting in audio-based localization. Turning first to energy consumption, the testing showed that watermarking when used alone (without fingerprinting) can consume significant amounts of energy. This is especially the case for noisy environments, and energy efficiency decreased as the mobile device was moved to greater distances from the loudspeaker. In contrast, the fingerprinting process proved to be very robust to ambient noise. The results also showed that watermarking can be sensitive to movements of the phone, with decreased effectiveness (including more energy consumption) with increased movements during receipt of audio signals with watermarks.

The testing helped identify the advantages and disadvantages of using either (but not both) watermarking and fingerprinting-based localizations. Watermarking allows for a more fine-grained localization, as every loudspeaker can transmit its individual watermark with a timestamp and a location identifier (and/or other watermark data). This allows a particular speaker within a space containing multiple speakers playing a single audio file to be identified, which allows the location to be identified to within a radius of a particular speaker rather than just within the space itself. Fingerprinting cannot distinguish between speakers that are playing the same content. Additionally, a fingerprint that is created from an audio snippet of an audio signal may not uniquely identify an audio track/input to a device. This is because in some cases that same snippet may appear in other audio tracks played in the venue. Therefore, there can be an inherent ambiguity to use of fingerprinting-based localization.

Watermarking-based localization, though, also has disadvantages as shown by the testing. For example, watermarking-based localization is more affected than fingerprinting-based localization by ambient noise and interference from neighboring loudspeakers (that may be playing the same or different content but often will be associated with a different watermark). Also, due to the dependence on phase information, movement of the phone/mobile device while receiving (e.g., faster than mere walking speed) may decrease the effectiveness of watermarking-based localization. Fingerprinting, in contrast, is more robust to noise and interference and is generally unaffected by movement of the mobile device while receiving the audio signal.

The energy consumption and CPU load of fingerprinting depends on how frequently the microphone is sampled for audio snippets (from which fingerprints are created) and, to a lesser degree, on the size of the fingerprint database used in the comparing steps. The energy consumption of watermarking is almost independent of the frequency of location beacons (watermarks) since the phone has to listen and decode the audio signal in a continuous manner. The CPU load, however, may depend on the frequency of the location beacons because lower frequencies may lead to synchronization loss and higher CPU load to acquire the synchronization again.

Figure 2:
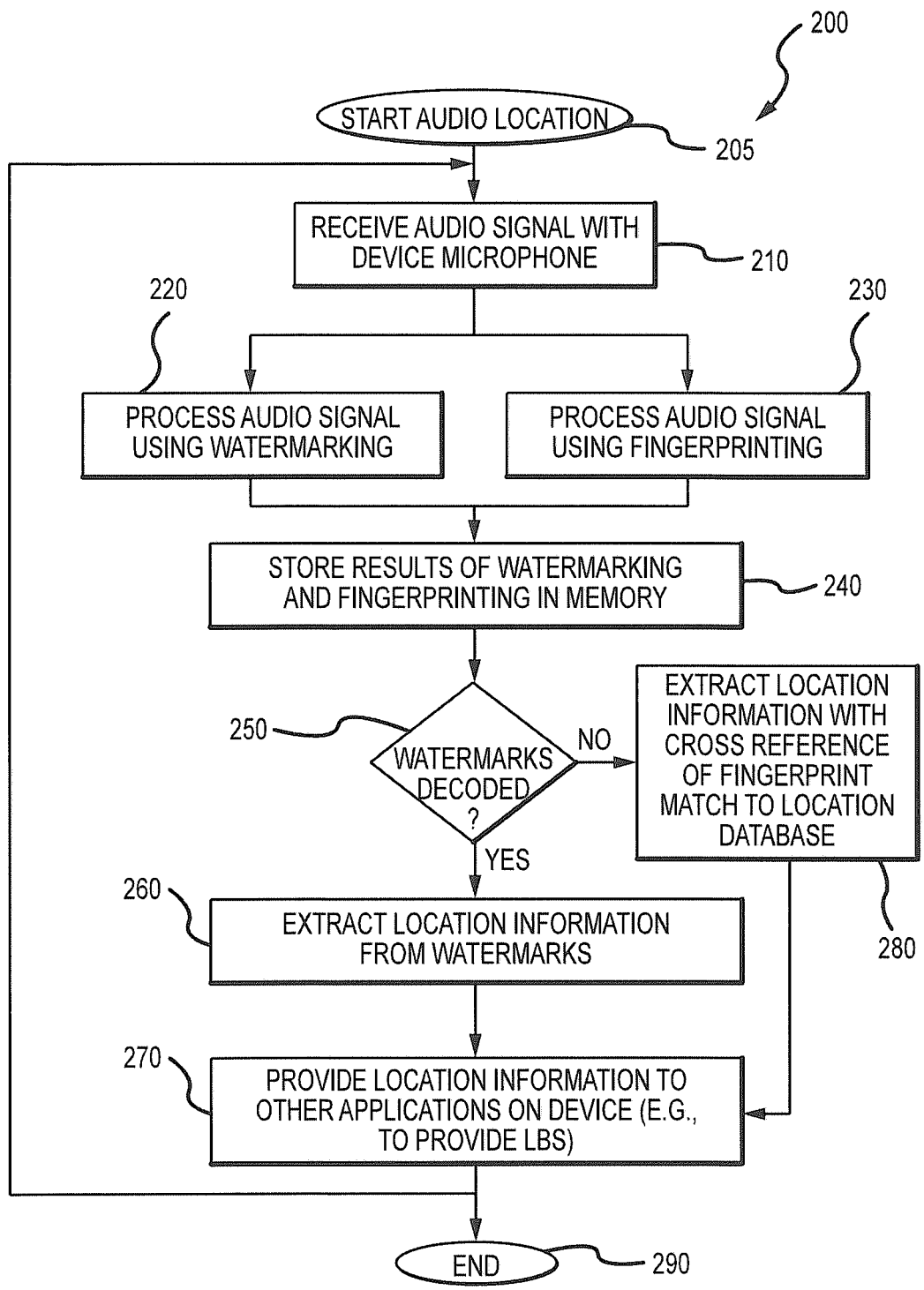
FIG. 2 is a flow diagram showing an exemplary audiolocate method that may be implemented by operation of the navigation system of FIG. 1.

FIG. 2 illustrates audiolocation 200 as it may be carried out by the system 100 of FIG. 1 to determine a location of a mobile device such as a smartphone running the audiolocation software suite 150 with modules 152 and 154 for performing fingerprint-based localization and watermarking-based localization. The method 200 begins at 205 such as with downloading the software suite 150 onto the mobile device 140. Step 205 may also include creating a set of fingerprints based on audio content to be played over loudspeakers 130, 136 of a sound system 120 in a venue 104. Further, step 205 may include storing these fingerprints 176 in a database 174 in the memory 170 of the device 140. Still further, beacons may be provided at or as part of the speakers 130, 136 to output watermarks in the audio output 132, 138 of each speaker, e.g., to provide an ID of the corresponding speaker 130, 136 that can be used to identify a location (e.g., a radius about a speaker 130 or 136) of the device 140. In other cases, the watermark data may be provided in the audio content 124 played on the speaker 130, 136.

The method 200 continues at 210 with an audio signal or audio input 161 being received by the device microphone 160. The method 200 involves running modules 152, 154 in parallel, and, to this end, the method 200 continues with processing the audio signal at 220 and 230 (in parallel on device 140) using watermarking (with module 154) and using fingerprinting (with module 152). The results of these two localization process are stored in device memory at step 240. As discussed above, watermarking may not be successful (e.g., a watermark may not be received successfully due to noise or interference or decoding may fail even if a watermark is received), and, with this in mind, the method 200 continues at 250 with a determination of whether or not watermarking at 220 was successful.

If watermarking successfully received and decoded a watermark in the audio signal 172, the method 200 continues at 260 with extracting the location information 188 of the device 140 from the watermark(s) (location beacon(s)). The method 200 continues at 270 with providing the location information 188 to another application such as a smartphone application 144 adapted to provide an LBS. The method 200 may continue at 210 with receiving another audio signal with the device microphone 160 and repeating localization processing at 220 and 230. In other cases, the method 200 may end at 290 such as with a user terminating localization functions (ending execution of the audiolocalization suite 150 on smartphone 140).

If at 250 it is determined that the watermarking at 220 was unsuccessful, the method 200 continues at 280 with extracting location information 188 using a fingerprint 180 to match a previously generated fingerprint 176 in database 174. The location information 188 may be found by cross referencing the fingerprint 176 with a location database (e.g., the location database may be used to store for each fingerprint 176 in the database 174 a location of one or more speaker(s) 130, 136 in the sound system 120 that are used to play a particular audio content associated with the fingerprint 176). In this manner, the method 200 involves running the watermarking and fingerprinting processes in parallel such that fingerprinting may provide a more coarse location 188 in cases where watermarking is not able to provide a more fine grain location 188. Note, though, steps 220 and 230 may also be performed in series (either first) or step 230 may only be performed after step 250 (i.e., after an indication that watermark-based localization at 220 was unsuccessful).

In some applications, it may be desirable to more selectively run the two audio-based localization modules 152, 154 of the software suite 150 on a device 140. For example, running both methods in parallel may be determined to put a strain on a mobile device's resources such as increasing CPU loads and/or increasing energy usage to more quickly drain the battery. Hence, combining watermarking and fingerprinting can be achieved in a more coordinated or selective manner in order to achieve a more optimal balance between location accuracy and resource consumption. The following discussion presents several ways that the use of watermarking can be coordinated with the use of fingerprinting in audiolocate methods (and corresponding systems such as system 100 of FIG. 1).

It was recognized by the inventors, through testing and other methods, that watermarking performs relatively poorly in the presence of noise and interference from neighboring speakers. Also, watermarks (or location beacons) generally are not embedded into silent parts of the audio track. To address these issues or characteristics with use of watermarking, fingerprinting can be used to detect during distorted or silent periods of a localization process. The confidence associated with the highest-ranking match in the fingerprint database may be relatively low during such periods. When these periods of distortion and silence are detected during audio-based localization (such as by determination that the confidence of fingerprint match is low), watermarking can be switched off to reduce resource consumption.

On the other hand, when the quality (signal-to-noise and interference ratio) of the audio signal is high, watermarking can be used to decode the location beacons (watermark data). A high quality audio signal may be determined to be present at the device by a high confidence of the highest-ranking match in the fingerprint database. When watermarking can be used, fingerprinting may be considered redundant since location beacons (watermarks) can convey location information of finer granularity (e.g., to a radius about a particular speaker within a space rather than simply within a space with multiple speakers playing the same content). Therefore, the audio-based localization method may involve, during the periods of good signal reception, switching off fingerprinting or performing fingerprinting on a less frequent basis (e.g., only periodically rather than nearly continuously).

Figure 3:
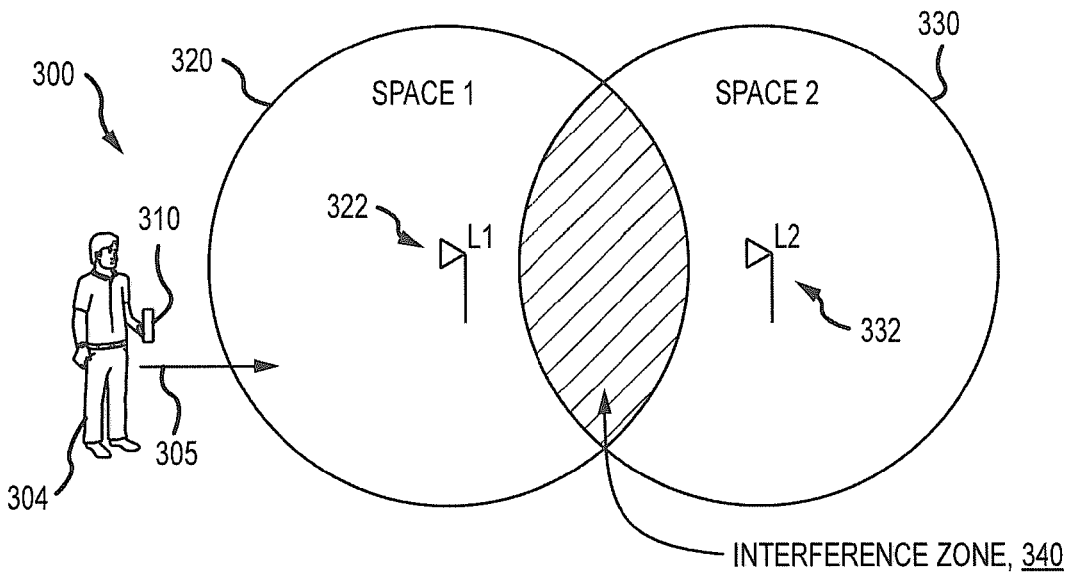
FIG. 3 is a schematic of an audio-based navigation system in which selective or coordinated use of audio fingerprinting and audio watermarking software is used to handle areas of interference to determine a location or position of a mobile device.

FIG. 3 illustrates an example of where such selective use of watermarking and fingerprinting may be utilized. As shown, a mobile device navigation system 300 is shown that includes a mobile device 310 (e.g., a smartphone) that is configured to include the audio-based localization suite including a fingerprinting module and a watermarking module to determine location of the device 310. A user 304 of the device 310 is shown to carry the device 310 as they move (as shown with arrow 305) through a first space 320 and then through a second space 330.

Each space 320, 330 includes one (or more) loudspeaker 322, 332 that is used to play audio content that can be heard through the space 320, 330, respectively, and, as such, received by a microphone on the mobile device 310 for processing. The audio content or audio signal provided by the speakers 322, 332 typically is unique to that space 320, 330, and it will include a watermark or watermark data (e.g., from a location ID/beacon provided by each speaker 322, 332 to provide identifying data for that speaker). The device 310 also will include in its memory a database with fingerprints previously generated for each audio file/content that may be output by the speakers 322, 332. The spaces 320, 330 are not distinct spaces, though, as they overlap in what is labeled an interference zone 340. Particularly, the audio signal from speaker 322 and from speaker 332 can both be concurrently received by the microphone of the device 310 as the device user 304 moves 305 through the zone 340.

The audio-based localization methods can be performed to account for interference in the system 300. As shown, a person 304 carrying a phone 310 (or other mobile device) passes 305 by two loudspeakers 322, 332 in spaces 320, 330. The speakers 322, 332 may be used by one or two sound systems to play two different audio contents. A part of the person's trajectory or path intersects the area or zone 340 where signals from the loudspeakers interfere with each other. Localization may combine the use of watermarking and fingerprinting (e.g., as shown in FIG. 1, selective processing by localization software 150 running on a phone 140 with modules 152, 154 of the audio signal 172) as shown in FIGS. 4-7.

Figure 4:
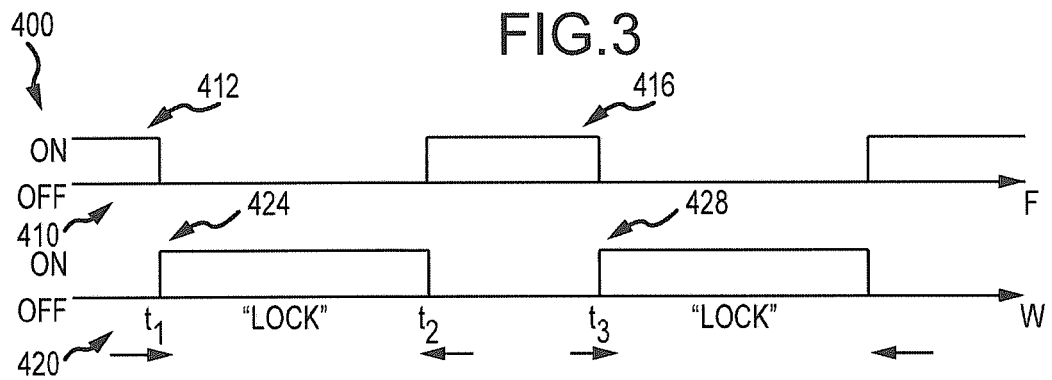
FIG. 4 illustrates graphically a localization method for use in the system of FIG. 3 to handle interference zones.

FIG. 4 illustrates a graph 400 showing selective and coordinated use of fingerprinting and watermarking such as in the system 300. Graph 400 shows with first subgraph 410 selective use of fingerprinting (running the fingerprinting software) over time and with second subgraph 420 selective use of watermarking (running the watermarking software) over the same time period or on the same timeline. As shown and with reference to FIG. 3, fingerprinting is initially active on the mobile device 310 as the person 304 moves 305 into the first space 320. This is shown in FIG. 4 at 412 with fingerprinting being active while the device 310 (or its software) is trying to acquire a good signal from speaker 322. Watermarking is switched off on the device 310 during this time as can be seen in subgraph 420 and remains off until a time, $t_1$, when the good signal from the speaker 322 is acquired by fingerprinting. This may be considered a "locking" onto a good or higher quality signal (e.g., one relatively free of interference from another speaker or another audio signal).

At this point as shown at 424, watermarking software is switched on in the device 310 to provide localization data for the device 310 (e.g., to provide LBS on the device 310) such as from location beacons from the speaker 322. Also, at this time, $t_1$, the fingerprinting is switched off as can be seen in subgraph 410. Then, at a later time, $t_2$, when the person 304 moves 305 the phone 310 into the interference area 340, the phone 310 stops receiving beacons from speaker 322, switches off the watermarking software as shown in subgraph 420, and resumes use of the fingerprinting software as shown at 416 in subgraph 410. When the device 310 is later moved out of the zone 340 further into space 330 at a later time, $t_3$, the phone "locks" onto a good signal from the loudspeaker 332, switches off the fingerprinting software, and starts the watermarking software as shown at 428 in subgraph 420.

Figure 5:
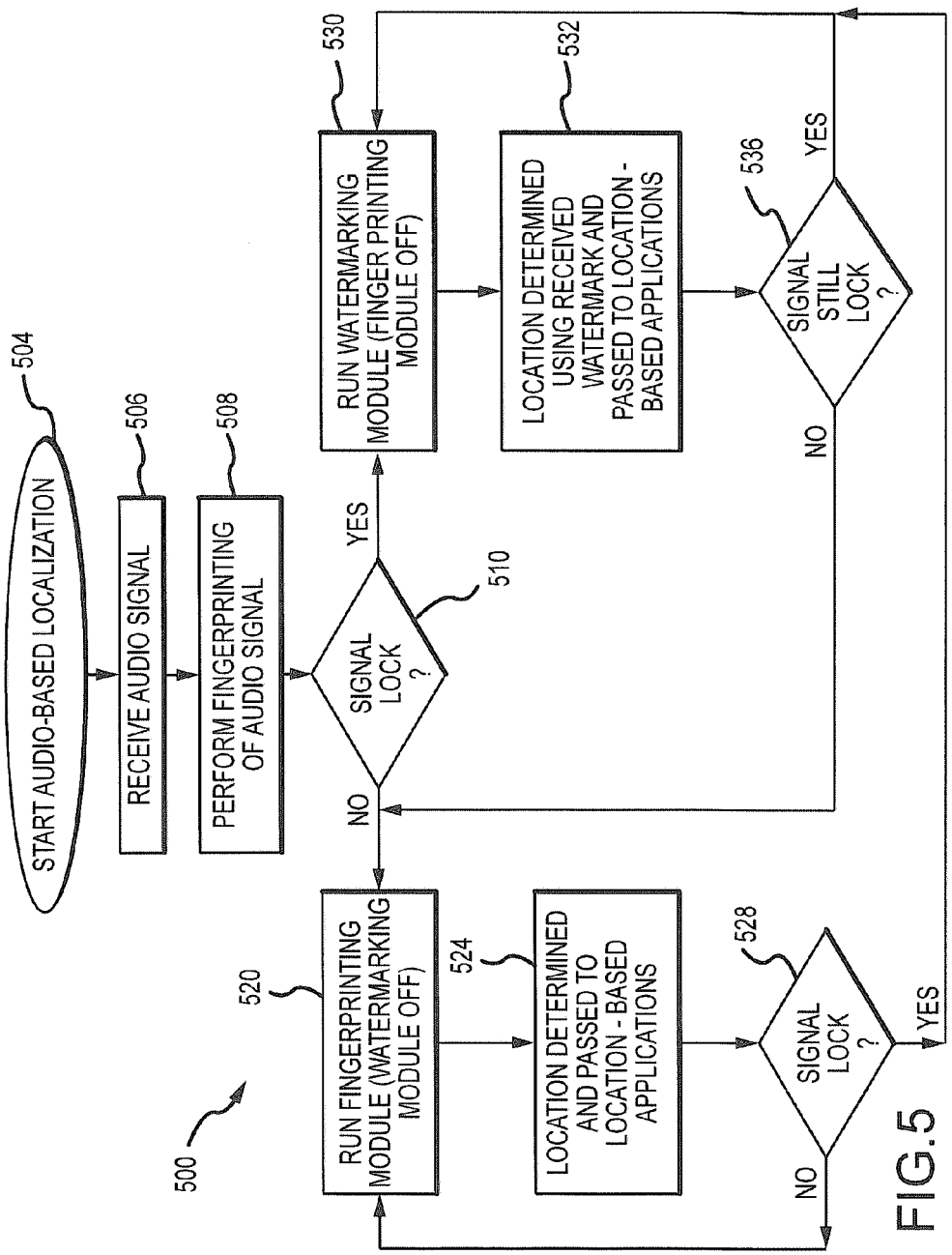
FIG. 5 is a flow diagram showing another exemplary audiolocate method as shown graphically in FIG. 4.

FIG. 5 illustrates an audiolocate method 500 that can be used to implement the processes shown graphically in FIG. 4. The audiolocate method 500 starts at 504 such as with loading an audio-based localization application (e.g., suite 150 of FIG. 1) onto a mobile device such as a tablet, a handheld video game, or a smartphone. Step 504 may also include initiating execution of this localization application, which causes the device's microphone at 506 to operate to receive audio signals from the space in which the device is located by its user/operator. At 508, the method 500 continues with processing the audio signal using the fingerprinting module to generate a fingerprint of the audio signal, to compare the generated fingerprint with those found in a fingerprint database on the device, and to use the best match to look up a location of the device (e.g., songs or other audio content may be played on predefined speakers or within particular spaces of a venue). At 510, the method 500 continues with processing the received audio signal to determine whether a signal lock is achieved. Step 510 may involve determining whether or not a beacon or watermark can be identified in the signal. In other cases, fingerprinting is performed as part of step 510 to determine whether the signal is a good signal (e.g., can fingerprinting of the signal provide a good match with fingerprints in fingerprint database on the device?).

If not locked, the method 500 continues at 520 with running the fingerprinting module or software. In step 520, the watermarking module is switched off or is not being executed to save on energy consumption and/or to reduce processing or CPU load. The method 500 continues at 524 with the fingerprinting module acting to generate a fingerprint and to determine a best match with a fingerprint from the locally stored fingerprint database. With this match, a cross reference to a location database may be performed to determine the device's present location (e.g., in space 320 or space 330 in the venue of FIG. 3). The location or position determined using fingerprinting can then be stored in local memory and/or passed to applications that use the present location of the device (e.g., to provide LBS). The method 500 continues at 528 with another determination of whether or not a signal lock has been achieved (e.g., what is the confidence in the fingerprint match?). If a lock is not achieved at 528, the method 500 continues at 520 with continued use of fingerprinting to determine the device's location. If a lock is achieved (good signal identified), the method continues at 530.

When a good signal is identified and/or signal lock is achieved at 510 or 528, the method 500 continues at 530 with the watermarking module being run and the fingerprinting module being switched off. At 532, the watermarking module acts to process the beacon or watermark to obtain the watermark data, e.g., a speaker ID. The watermark data is then used to determine a relatively precise location of the device (e.g., within a radius of a particular speaker among numerous speakers at a venue), and this location can be stored in memory and/or passed to location-based applications. The method 500 continues at 536 with determining whether the signal is still locked (e.g., still receiving a beacon/signal with a watermark?). If the signal is still locked, the method 500 continues at 530. If the signal is no longer locked at 536, the method 500 continues at 520 with switching the fingerprinting module back on and switching the watermarking module off.

Figure 6:
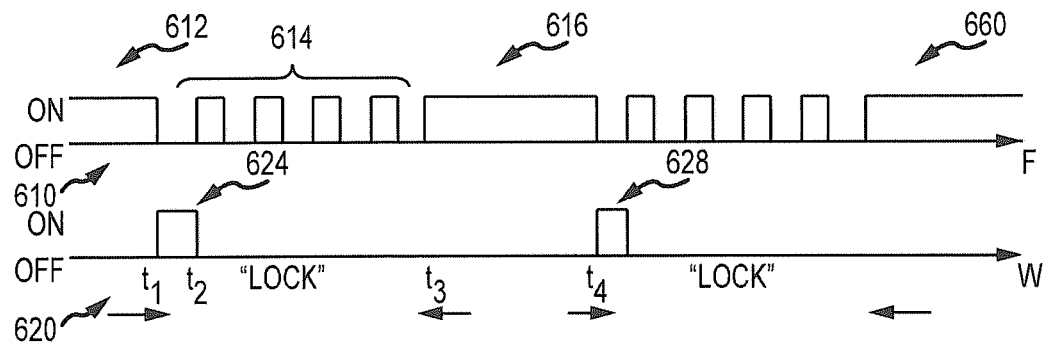
FIG. 6 illustrates graphically another embodiment of a localization method for use in the system of FIG. 3 to handle interference zones.

FIG. 6 illustrates a graph 600 showing selective and coordinated use of fingerprinting and watermarking such as in the system 300. Graph 600 shows with first subgraph 610 selective use of fingerprinting (running the fingerprinting software) over time and with second subgraph 620 selective use of watermarking (running the watermarking software) over the same time period or on the same timeline. In the audio-based localization shown in FIG. 6, fingerprinting is used initially as shown at 612 to process received audio signals at a device. When fingerprinting locks onto a good signal (e.g., from loudspeaker 322 in space 320 as shown in FIG. 3) at a first time, $t_1$, watermarking is activated as shown at 624. Watermarking remains active on the device until the first location beacon is received and decoded at a later time, $t_2$.

As discussed earlier in this description, the location beacon or watermark data uniquely identifies the location of the mobile device (e.g., phone 310 is close to loudspeaker 322) unlike the fingerprinting-produced location during processing 612. The fingerprint match can sometimes be ambiguous about the location (e.g., same snippet/fingerprint found in more than one audio content). Once the location beacon is received at this later/second time, $t_2$, watermarking is switched off, and the fingerprinting software is activated as shown at 614 in FIG. 6.

The fingerprinting, though, is performed at a lower frequency than during initial lock at 612, and the frequency can be picked (e.g., once every 15 seconds, once every 30 seconds, or the like) so as to periodically confirm that the device 310 is still in the vicinity of the speaker identified by the watermarking (e.g., still near speaker 322 in space 320). When the confidence of the fingerprint match drops below a particular preset level (which indicates signal distortion such as may occur in interference zone 340 in system 300 of FIG. 3) at a later time, $t_3$, fingerprinting frequency is increased as shown at 616 (such as from once every 30 seconds to once every 1 to 10 seconds) until a lock is again obtained with fingerprinting at a later time, $t_4$, such as when fingerprinting indicates a higher confidence match from a signal from speaker 332 in the second space 330 of system 300. Upon lock, watermarking is again activated as shown at 628 until the first location beacon or watermark is received and properly decoded (at which point the cycle can repeat as shown with subgraphs 610, 620 of graph 600 of FIG. 6).

Figure 7:
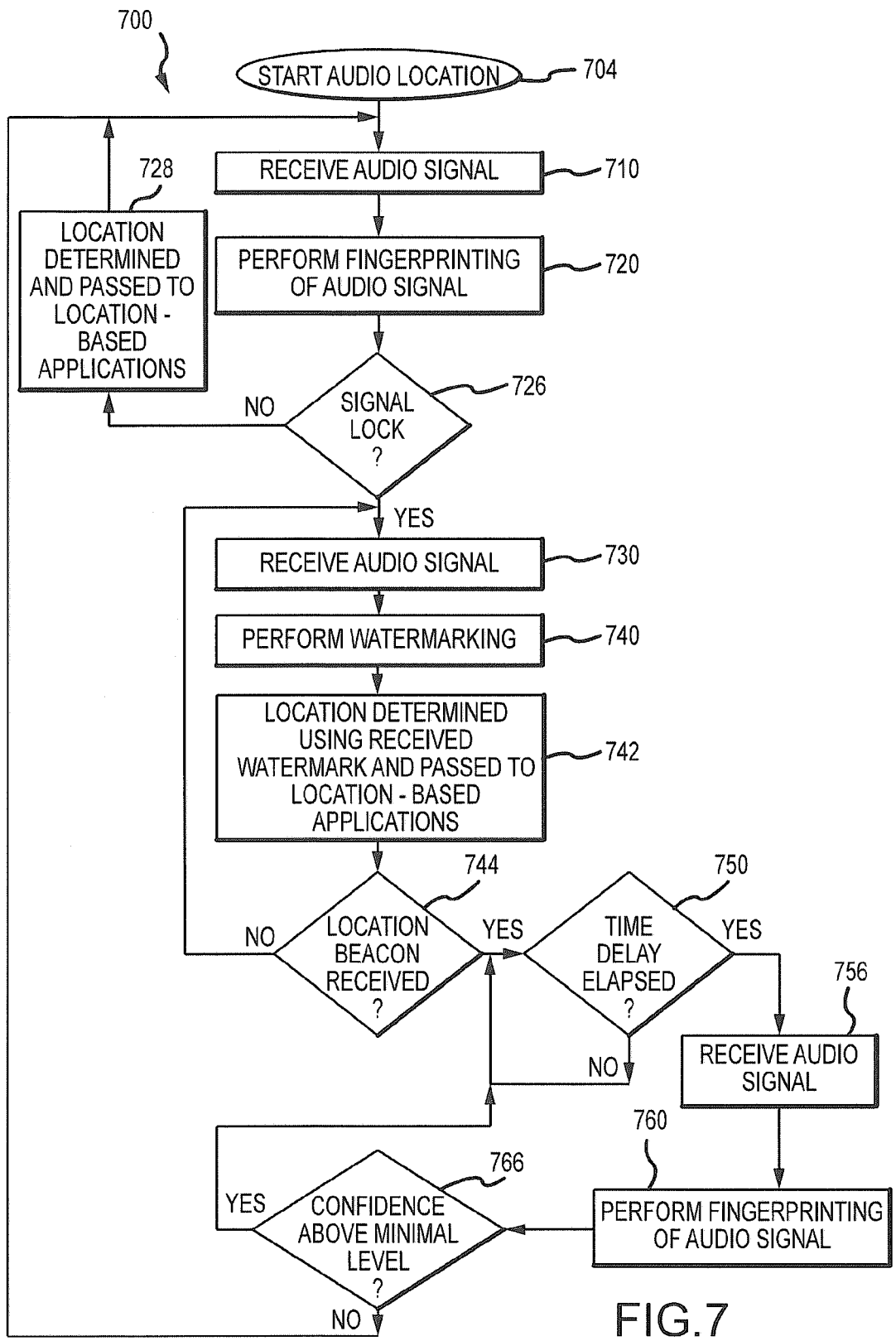
FIG. 7 is a flow diagram showing another exemplary audiolocate method as shown graphically in FIG. 6.

FIG. 7 illustrates an audiolocate method 700 that can be used to implement the processes shown graphically in FIG. 6. The audiolocate method 700 starts at 704 such as with loading an audio-based localization application (e.g., suite 150 of FIG. 1) onto a mobile device such as a tablet, a handheld video game, or a smartphone. Step 704 may also include initiating execution of this localization application, which causes the device's microphone at 710 to operate to receive audio signals from the space in which the device is located by its user/operator. At 720, the method 700 continues with processing the audio signal using the fingerprinting module to generate a fingerprint of the audio signal, to compare the generated fingerprint with those found in a fingerprint database on the device, and to use the best match to look up a location of the device (e.g., songs or other audio content may be played on predefined speakers or within particular spaces of a venue).

At 726, the method 700 continues with determining whether a good signal has been received and identified by the fingerprinting at 710 (e.g., is the confidence of a match above a predefined minimum confidence level?). If not, the method 700 continues at 728 with the fingerprinting module acting to generate a fingerprint and to determine a best match with a fingerprint from the locally stored fingerprint database. With this match, a cross reference to a location database may be performed to determine the device's present location (e.g., in space 320 or space 330 in the venue of FIG. 3). The location or position determined using fingerprinting can then be stored in local memory and/or passed to applications that use the present location of the device (e.g., to provide LBS). The method 700 then continues with performing steps 710 and 720 until a signal lock is found at step 726. The frequency of fingerprinting may be relatively high at this point in the method 700 (such as once every several seconds, once every 200 to 500 milliseconds, or the like).

Once a lock is achieved/identified at 726, the method continues at 730 with receiving an audio signal and then at 740 performing watermarking on this signal, e.g., to identify a location beacon from a speaker in a venue, which can be used to provide a higher precision position of the device (e.g., close to a particular speaker). At 742, the watermarking module acts to process the beacon or watermark to obtain the watermark data, e.g., a speaker ID. The watermark data is then used to determine a relatively precise location of the device (e.g., within a radius of a particular speaker among numerous speakers at a venue), and this location can be stored in memory and/or passed to location-based applications. At 744, the method 700 continues with determining whether or not a location beacon was provided in the received audio signal. If not, the method 700 continues at 730 and 740 with receiving another signal and processing it for a location beacon or watermark data. Until a beacon/watermark is found, watermarking is continued and the location provided by fingerprinting step 720 is used as the present location/position of the device in a venue (e.g., still in space 320 of the venue/system 300 of FIG. 3). Once a beacon is found by watermarking, the watermarking-provided location is used to update or replace the fingerprinting location for use by position-based applications or services on the mobile device.

Then, the method 700 continues at 750 with determining whether or not a time delay period has passed (such as 30 to 120 seconds or the like). If not, the method 700 continues with checking at step 750 for this time period to pass prior to moving on at 756 with receiving another audio signal. Then, at 760, the method 700 continues with performing fingerprinting of the signal to verify that the device is still proximate to the speaker identified by watermarking at step 740. In this manner, the frequency of performing processing of audio signals can be decreased to save on energy consumption and CPU load (move from once every several seconds to once a minute or the like).

At step 766, the results of the fingerprinting of step 760 are determined to be above or below a predefined fingerprint match confidence level. If below, there may be an issue with distortion, and the method 700 may continue with higher frequency fingerprinting at steps 710-726. Also, the method 700 may include a step of determining whether or not the location has changed from that identified at step 740. For example, the fingerprinting at step 760 may find that the location of the device is no longer that found by the watermarking, e.g., the device 310 has been moved from the first space 320 to the second space 330 with distortion identified by the confidence check at 766. In this case, the method 700 may move to steps 710-726 for higher frequency fingerprinting until a good signal is locked in at the device.

In another embodiment, audiolocation involves use of a scrambling code to encode every song or audio content file. The scrambling code may be unique to each speaker in a venue, and the mobile device may store a database of keys for each of these codes. In this way, each speaker may play the same song/content, but each audio signal would have to be decoded with a particular key associated with the closest speaker. The audio-based localization software would be adapted to try to decode the song (or other received audio content) with each key until the song or other audio content was successfully decoded. The localization software could then use a cross-referenced speaker ID or location associated with the decoding key to determine a present location of the mobile device. In some cases, the scrambled code or data would provide the location information so that further lookup of the location is not required.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The inventors recognized that entertainment venues such as sport stadiums, theme parks, playgrounds, cinemas, and theaters typically host large crowds of visitors. Often, a sound system is provided that includes a number of loudspeakers that are deployed in prominent locations so that they can output sound heard by all or most of the visitors throughout the venue. Many of these venues are so large that they have distinct areas with each such area or separate space having one-to-many loudspeakers playing the same audio content for visitors in that area or space.

One objective of the audiolocation method and system described herein is to use an existing audio infrastructure (sound system with loudspeakers and audio content sources/servers) of an entertainment venue to localize mobile phones or other mobile devices (with microphones for receiving audio input and processors for running the audiolocation software/modules). The determined localization information can then be used to offer richer experience designs based on the phone locations such as to provide LBS more effectively and efficiently.

Several means are available to implement the systems and methods discussed in this specification. These means include, but are not limited to, digital computer systems, microprocessors, application-specific integrated circuits (ASIC), general purpose computers, programmable controllers and field programmable gate arrays (FPGAs), all of which may be generically referred to herein as "processors" (such as represented by processor(s) 142 in the mobile device 140 of FIG. 1). For example, in one embodiment, signal processing may be incorporated by an FPGA or an ASIC, or alternatively by an embedded or discrete processor. Therefore, other embodiments include program instructions resident on computer readable media which when implemented by such means enable them to implement various embodiments. Computer readable media include any form of a non-transient physical computer memory device (such as memory 170 of device 140 in FIG. 1). Examples of such a physical computer memory device include, but are not limited to, punch cards, magnetic disks or tapes, optical data storage systems, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions (such as those in localization suite 150 in FIG. 1) include, but are not limited to, computer-executable instructions executed by computer system processors and hardware description languages such as Very High Speed Integrated Circuit (VHSIC) Hardware Description Language (VHDL).

We claim:

1. A system for audio-based navigation or localization, comprising:
   a sound system with a first speaker playing first audio content and a second speaker playing second audio content, wherein the first speaker is positioned in a first space in a venue and the second speaker is positioned in a second space of the venue; and
   a mobile device with memory storing a database of fingerprints of a plurality of differing audio content, with a microphone for receiving an audio signal associated with the first audio content or the second audio content, and with a processor running at least one of a fingerprinting module and a watermarking module to determine a location of the mobile device by processing the received audio signal,
   wherein the processor runs the fingerprinting module and the watermarking module in parallel to process the audio signal, and
   wherein the location is provided by the watermarking module when a watermark is decoded from the audio signal by the watermarking module and provided by the fingerprinting module when decoding by the watermarking module fails.

2. The system of claim 1, wherein the received audio signal comprises a watermark identifying the first speaker or the second speaker as a source of the received audio signal and wherein the watermarking module decodes the watermark to provide the location of the mobile device relative to the first or second speaker.

3. The system of claim 1, wherein the fingerprinting module determines the location by generating a fingerprint based on the audio signal, comparing the generated fingerprint with the fingerprints in the database to find a best matching fingerprint, and finding a location cross-referenced to the best matching fingerprint.

4. A system for audio-based navigation or localization, comprising:
   a sound system with a first speaker playing first audio content and a second speaker playing second audio content, wherein the first speaker is positioned in a first space in a venue and the second speaker is positioned in a second space of the venue; and
   a mobile device with memory storing a database of fingerprints of a plurality of differing audio content, with a microphone for receiving an audio signal associated with the first audio content or the second audio content, and with a processor running at least one of a fingerprinting module and a watermarking module to determine a location of the mobile device by processing the received audio signal,
   wherein the processor initially only runs the fingerprinting module to provide the location and runs the watermarking module to provide the location after the audio signal is locked based on processing by the fingerprinting module,
   wherein the processor switches the fingerprinting module off when the audio signal is locked, and
   wherein the processor resumes use of the fingerprinting module and switches the watermarking module off when the watermarking is unable to decode a watermark in the received audio signal.

5. The system of claim 4, wherein the audio signal is locked when a fingerprint match achieved by the fingerprinting module has a confidence level greater than a predefined minimum confidence level.

6. The system of claim 4, wherein the received audio signal comprises a watermark identifying the first speaker or the second speaker as a source of the received audio signal and wherein the watermarking module decodes the watermark to provide the location of the mobile device relative to the first or second speaker.

7. The system of claim 4, wherein the fingerprinting module determines the location by generating a fingerprint based on the audio signal, comparing the generated fingerprint with the fingerprints in the database to find a best matching fingerprint, and finding a location cross-referenced to the best matching fingerprint.

8. A system for audio-based navigation or localization, comprising:
   a sound system with a first speaker playing first audio content and a second speaker playing second audio content, wherein the first speaker is positioned in a first space in a venue and the second speaker is positioned in a second space of the venue; and
   a mobile device with memory storing a database of fingerprints of a plurality of differing audio content, with a microphone for receiving an audio signal associated with the first audio content or the second audio content, and with a processor running at least one of a fingerprinting module and a watermarking module to determine a location of the mobile device by processing the received audio signal,
   wherein the processor initially only runs the fingerprinting module to provide the location and runs the watermarking module to provide the location after the audio signal is locked based on processing by the fingerprinting module, and
   wherein the processor switches the watermarking module off after a first watermark is decoded in the received audio signal and switches the fingerprinting module on to provide the location on a periodic basis.

9. The system of claim 8, wherein the fingerprinting module performs fingerprinting at an increased frequency upon a loss of signal lock.

10. The system of claim 8, wherein the received audio signal comprises a watermark identifying the first speaker or the second speaker as a source of the received audio signal and wherein the watermarking module decodes the watermark to provide the location of the mobile device relative to the first or second speaker.

11. The system of claim 8, wherein the fingerprinting module determines the location by generating a fingerprint based on the audio signal, comparing the generated fingerprint with the fingerprints in the database to find a best matching fingerprint, and finding a location cross-referenced to the best matching fingerprint.

12. The system of claim 8, wherein the audio signal is locked when a fingerprint match achieved by the fingerprinting module has a confidence level greater than a predefined minimum confidence level.

13. A system for audio-based localization, comprising:
   a sound system with a first speaker playing first audio content and a second speaker playing second audio content, wherein the first speaker is positioned in a first space in a venue and the second speaker is positioned in a second space of the venue; and
   a mobile device with memory storing a database of fingerprints of a plurality of differing audio content, with a microphone for receiving an audio signal associated with the first audio content or the second audio content, and with a processor selectively running a fingerprinting module and a watermarking module to determine a location of the mobile device by processing the received audio signal,
   wherein the processor first runs the fingerprinting module to provide the location and second runs the watermarking to provide the location after the audio signal is locked based on processing by the fingerprinting module,
   wherein the processor switches the fingerprinting module off when the audio signal is locked, and
   wherein the processor resumes use of the fingerprinting module and switches the watermarking module off when the watermarking is unable to decode a watermark in the received audio signal.

14. The system of claim 13, wherein the audio signal is locked when a fingerprint match achieved by the fingerprinting module has a confidence level greater than a predefined minimum confidence level.

15. The system of claim 13, wherein the processor switches the watermarking module off after a first watermark is decoded in the received audio signal and switches the fingerprinting module on to provide the location on a periodic basis.

16. The system of claim 15, wherein the fingerprinting module performs fingerprinting at an increased frequency upon a loss of signal lock.

17. A system for audio-based navigation or localization, comprising:
- a sound system with a first speaker playing first audio content and a second speaker playing second audio content, wherein the first speaker is positioned in a first space in a venue and the second speaker is positioned in a second space of the venue; and
- a mobile device with a microphone for receiving an audio signal associated with the first audio content or the second audio content,
- wherein the mobile device further includes a processor running a fingerprinting module and a watermarking module to determine a location of the mobile device by processing the received audio signal,
- wherein the processor runs the fingerprinting module and the watermarking module in parallel to process the audio signal, and
- wherein the location is provided by the watermarking module when a watermark is decoded from the audio signal by the watermarking module and provided by the fingerprinting module when decoding by the watermarking module fails.

18. A system for audio-based navigation or localization, comprising:
- a sound system with a first speaker playing first audio content and a second speaker playing second audio content, wherein the first speaker is positioned in a first space in a venue and the second speaker is positioned in a second space of the venue; and
- a mobile device with a microphone for receiving an audio signal associated with the first audio content or the second audio content,
- wherein the mobile device further includes a processor running a fingerprinting module and a watermarking module to determine a location of the mobile device by processing the received audio signal,
- wherein the processor initially only runs the fingerprinting module to provide the location and runs the watermarking to provide the location after the audio signal is locked based on processing by the fingerprinting module,
- wherein the processor switches the fingerprinting module off when the audio signal is locked, and
- wherein the processor resumes use of the fingerprinting module and switches the watermarking module off when the watermarking is unable to decode a watermark in the received audio signal.

19. The system of claim 18, wherein the audio signal is locked when a fingerprint match achieved by the fingerprinting module has a confidence level greater than a predefined minimum confidence level.

20. A system for audio-based navigation or localization, comprising:
- a sound system with a first speaker playing first audio content and a second speaker playing second audio content, wherein the first speaker is positioned in a first space in a venue and the second speaker is positioned in a second space of the venue; and
- a mobile device with a microphone for receiving an audio signal associated with the first audio content or the second audio content,
- wherein the mobile device further includes a processor running a fingerprinting module and a watermarking module to determine a location of the mobile device by processing the received audio signal,
- wherein the processor initially only runs the fingerprinting module to provide the location and runs the watermarking to provide the location after the audio signal is locked based on processing by the fingerprinting module,
- wherein the processor switches the watermarking module off after a first watermark is decoded in the received audio signal and switches the fingerprinting module on to provide the location on a periodic basis, and
- wherein the fingerprinting module performs fingerprinting at an increased frequency upon a loss of signal lock.

21. A system for audio-based localization, comprising:
- a sound system with a first speaker playing first audio content and a second speaker playing second audio content, wherein the first speaker is positioned in a first space in a venue and the second speaker is positioned in a second space of the venue; and
- a mobile device with memory storing a database of fingerprints of a plurality of differing audio content, with a microphone for receiving an audio signal associated with the first audio content or the second audio content, and with a processor selectively running a fingerprinting module and a watermarking module to determine a location of the mobile device by processing the received audio signal,
- wherein the processor first runs the fingerprinting module to provide the location and second runs the watermarking to provide the location after the audio signal is locked based on processing by the fingerprinting module, and
- wherein the processor switches the watermarking module off after a first watermark is decoded in the received audio signal and switches the fingerprinting module on to provide the location on a periodic basis.

22. The system of claim 21, wherein the audio signal is locked when a fingerprint match achieved by the fingerprinting module has a confidence level greater than a predefined minimum confidence level.

23. The system of claim 21, wherein the fingerprinting module performs fingerprinting at an increased frequency upon a loss of signal lock.

* * * * *